(No Model.) 2 Sheets—Sheet 1.

C. L. JOHNSON.
CARRIAGE SEAT.

No. 465,375. Patented Dec. 15, 1891.

Witnesses
Alice A. Perkins
Emma J. Smith

Inventor
Charles L. Johnson
by Alban Andrew
his atty.

THE NORRIS PETERS CO., PHOTO-LITHO., WASHINGTON, D. C.

(No Model.) 2 Sheets—Sheet 2.

C. L. JOHNSON.
CARRIAGE SEAT.

No. 465,375. Patented Dec. 15, 1891.

Witnesses
Alice A. Perkins
Emma J. Smith

Inventor
Charles L. Johnson
by Van ... 
his atty.

UNITED STATES PATENT OFFICE.

CHARLES L. JOHNSON, OF AMESBURY, MASSACHUSETTS.

CARRIAGE-SEAT.

SPECIFICATION forming part of Letters Patent No. 465,375, dated December 15, 1891.

Application filed February 5, 1891. Serial No. 380,286. (No model.)

*To all whom it may concern:*

Be it known that I, CHARLES L. JOHNSON, a citizen of Sweden, and a resident of Amesbury, in the county of Essex and State of Massachusetts, have invented new and useful Improvements in Carriage-Bodies, of which the following, taken in connection with the accompanying drawings, is a specification.

This invention relates to improvements in carriage-bodies, and it is carried out as follows, reference being had to the accompanying drawings, wherein—

Figure 1:
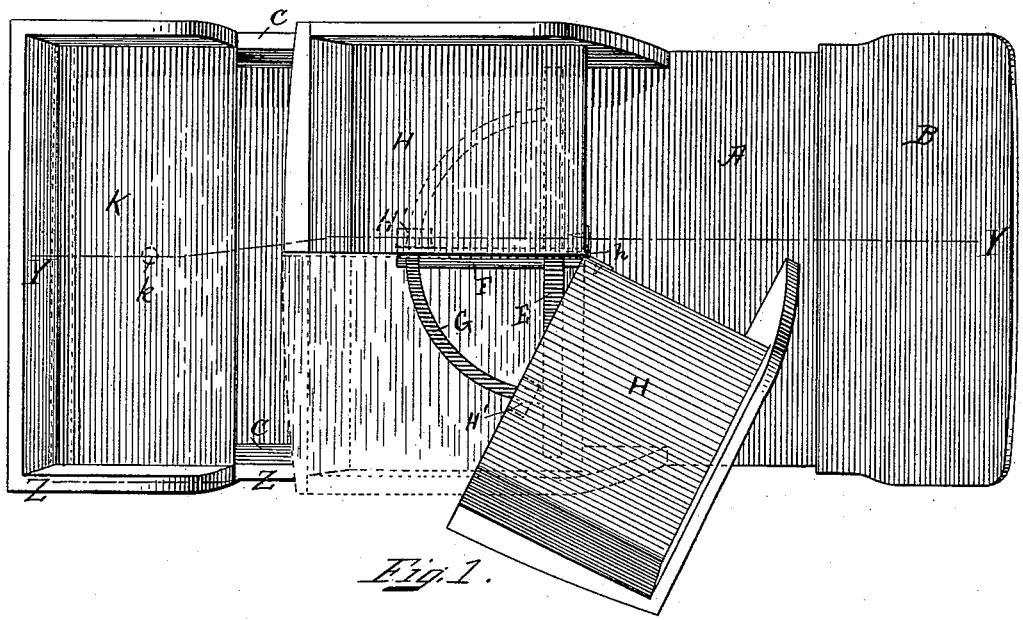
Figure 2:
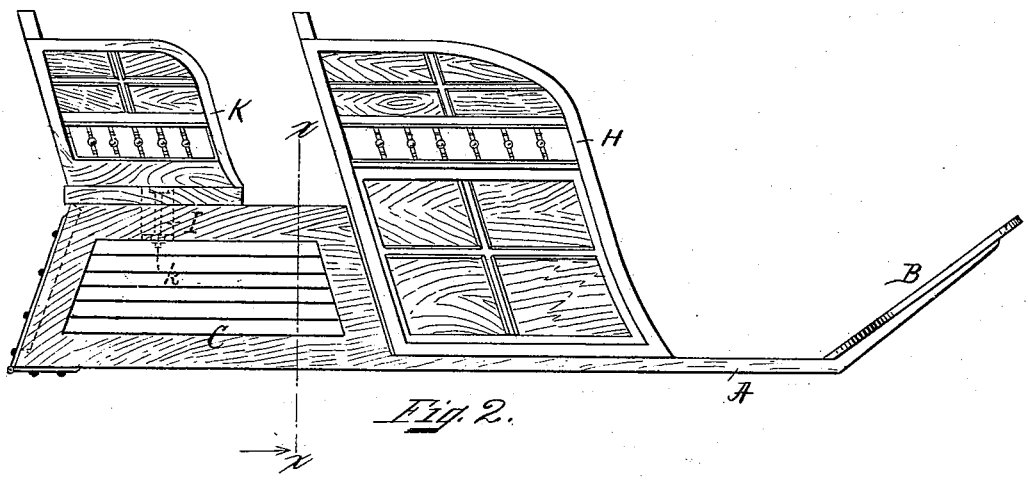
Figure 3:
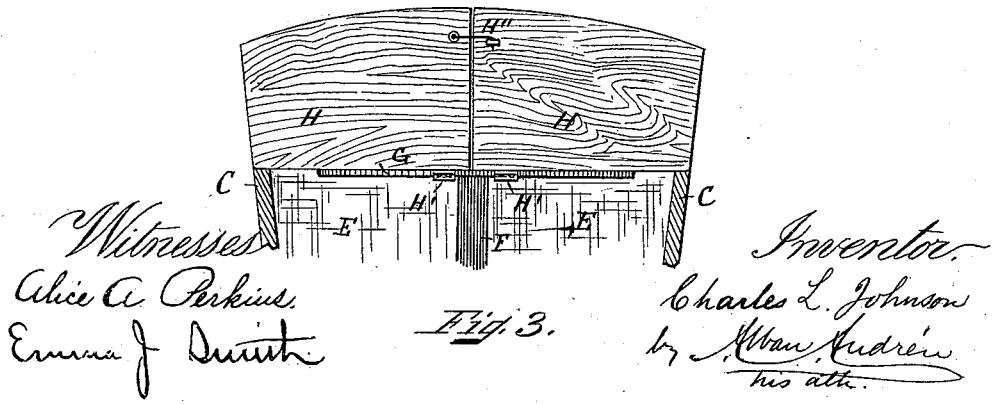
Figure 4:
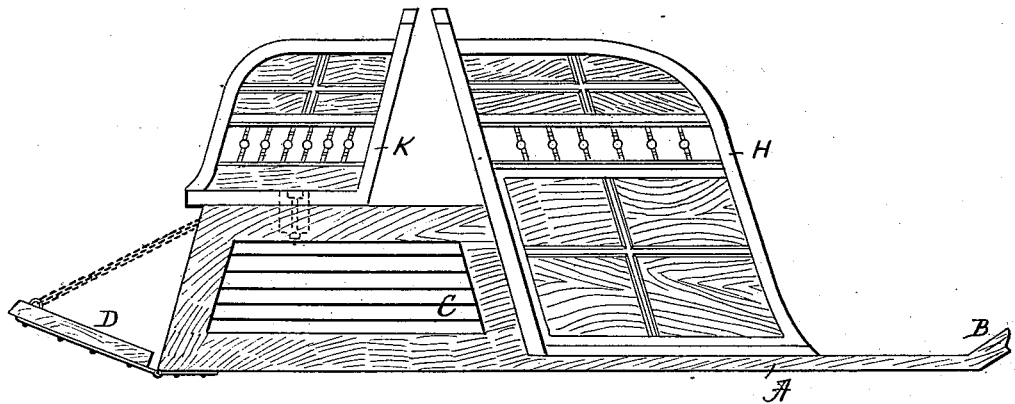
Figure 5:
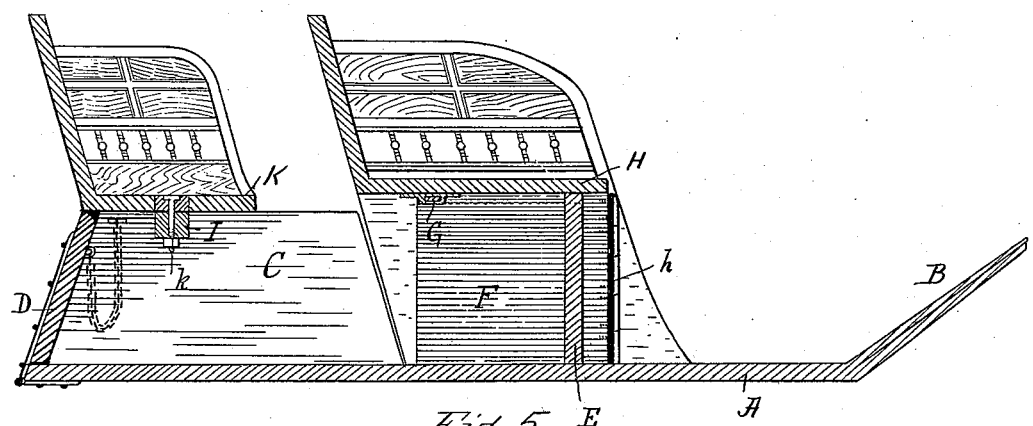
Figure 6:
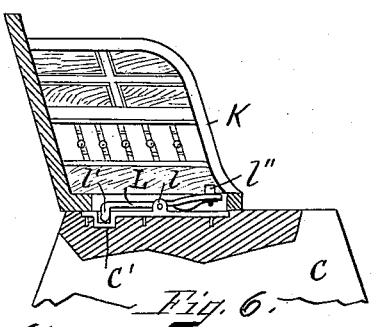

Figure 1 represents a plan view of the invention, showing one of the front-seat sections as swung to one side. Fig. 2 represents a side elevation showing the rear seat facing toward the front of the carriage. Fig. 3 represents a cross-section on the line X X shown in Fig. 2. Fig. 4 represents a side elevation showing the rear seat as reversed. Fig. 5 represents a longitudinal section on the line Y Y shown in Fig. 1, and Fig. 6 represents a cross-section on the line Z Z shown in Fig. 1.

Similar letters refer to similar parts wherever they occur on the different parts of the drawings.

A is the bottom board; B, the toe-board; C C, the body sides, and D the hinged tail-board, in the usual manner.

E is the upright top bar, and F is the upright center brace on which the front seat is supported. G is a semicircular guide-iron secured to said top bar and center brace, serving as a support and guide for the front seat. The front seat is divided transversely into two coequal sections H, pivoted at the front portion to the forward end of the center brace F, as shown in Fig. 1, to enable either one of said front-seat portions to be swung outward to enable passengers to get easily into or out of the space back of said front seat.

H' H' are guide-plates secured to the under sides of the front-seat sections H H and adapted to receive the circle G, in this manner serving as guides in operating said front-seat portions and to limit their forward swinging motions.

The front-seat portions H H are normally secured together by means of a suitable locking device H", as shown in Fig. 3.

I is a brace on which the rear seat K is pivoted by means of a suitable bolt or pin k, which pivot-pin is preferably located a little nearer to the front end of said seat as compared with its back end, as shown in Figs. 1 and 5, so as to allow of a proper space between the front and rear seats when the rear seat is turned to the position shown in Figs. 1, 2, and 5.

The back seat may be reversed to the position shown in Fig. 4 simply by swinging it half a revolution around the pivot k and locking it to the body sides by means of any suitable locking mechanism. In Fig. 6 I have shown a very simple locking mechanism for this purpose, consisting, preferably, of a pivoted spring-pressed lock-lever L, pivoted at l to the side of the rear seat K and having in one end a projection l', adapted to lock in a socket C' in the body side C and having in its other end a push-button l'', projecting upward through a perforation in said rear seat K.

What I wish to secure by Letters Patent and claim is—

1. The combination, with the bottom board of a carriage-body, of the upright top bar E, the upright center brace F, the semicircular guide-iron G, secured at the upper portion of the top bar and center brace, and the transversely-divided seat extending over the top bar and having its two sections pivoted at their front portions and each having a guide-plate H', engaging the semicircular guide-iron, substantially as described.

2. The combination, with the bottom board A, body sides C, and reversible rear seat K, of the upright top bar E, the upright center brace F, the semicircular guide-iron G, secured to the upper portions of the top bar and center brace, and the transversely-divided front seat having its sections pivoted at their front portions and provided with guide-plates H', engaging the semicircular guide-iron, substantially as described.

In testimony whereof I have signed my name to this specification, in the presence of two subscribing witnesses, on this 31st day of December, A. D. 1890.

CHARLES L. JOHNSON.

Witnesses:
ALBAN ANDRÉN,
ALICE A. PERKINS.